United States Patent [19]
Joe

[11] Patent Number: 5,870,257
[45] Date of Patent: Feb. 9, 1999

[54] HEAD DRUM ASSEMBLY FOR USE IN A DIGITAL VIDEO CASSETTE RECORDER

[75] Inventor: Yeo-Uk Joe, Seoul, Rep. of Korea

[73] Assignee: Daewoo Electronics Co., Ltd., Seoul, Rep. of Korea

[21] Appl. No.: 858,719

[22] Filed: May 19, 1997

[30] Foreign Application Priority Data

May 21, 1996 [KR] Rep. of Korea ................ 1996 12715

[51] Int. Cl.⁶ ........................................................ G11B 5/08
[52] U.S. Cl. ............................................. 360/107; 360/84
[58] Field of Search ................................... 360/107, 108, 360/84

[56] References Cited

U.S. PATENT DOCUMENTS

| 4,509,084 | 4/1985 | Fujioka et al. | 360/84 |
| 4,564,876 | 1/1986 | Takahashi et al. | 360/107 |
| 4,609,960 | 9/1986 | Fujioka | 360/108 |
| 5,684,656 | 11/1997 | Jung | 360/107 |

*Primary Examiner*—John H. Wolff
*Attorney, Agent, or Firm*—Anderson, Kill & Olick, P.C.

[57] ABSTRACT

A head drum assembly for use in a digital video cassette recorder includes a miniaturized transformer which has a rotor piece provided with a groove and a stator piece provided with an identical groove as that of the rotor piece groove, wherein the groove of the rotor piece is commonly used for a pair of heads.

2 Claims, 3 Drawing Sheets

HEAD DRUM ASSEMBLY FOR USE IN A DIGITAL VIDEO CASSETTE RECORDER

FIELD OF THE INVENTION

The present invention relates to a head drum assembly for use in a digital video cassette recorder; and, more particularly, to a transformer for transmitting signals from or into heads incorporated therein.

BACKGROUND OF THE INVENTION

There is shown in FIG. 1 a conventional head drum assembly for use in a digital video cassette recorder including a fixed shaft 1, a drum motor 2, a flange 3, a rotary drum 4, a stationary drum 5, an upper and a lower bearings 6, 6', a first and a second heads 7, 8 and a transformer 10 having a rotor and a stator pieces 11, 13.

The drum motor 2 is adjoined to an upper portion of the fixed shaft 1. The flange 3 on which the rotary drum 4 is fixedly pressed is joined with a middle portion of the fixed shaft 1 via the bearings 6, 6' in such a way that the flange 3 rotates by a driving force of the drum motor 2. The pair of heads 7, 8 are attached on a lower surface of the rotary drum 4. The stationary drum 5 is tightly pressed onto a lower portion of the fixed shaft 1.

The rotor piece 11 of the transformer 10 is attached on the flange 3 and the stator piece 13 thereof is attached on a top surface of the stationary drum 5 in such a way that the rotor and the stator pieces 11, 13 are aligned but separated from each other by a predetermined gap therebetween. Further, the rotor piece 11 is provided with a pair of circular grooves 11a, 11b, wherein the rotor piece groove 11a is used for the first head 7 and the rotor piece groove 11b is used for the second head 8; and also the stator piece 13 has a pair of circular grooves 13a, 13b identical as those of the rotor piece 11, wherein a winding 17 connected to a signal processing system (not shown) is inserted into each of the stator piece grooves 13a, 13b.

Meanwhile, a wire 15 connected to the first head 7 is wound around the rotor piece groove 11a so as to transmit a signal from the first head 7 into the stator piece 13 or vice versa, and another wire 16 connected to the second head 8 is wound around the rotor piece groove 11b so as to transmit a signal from the second head 8 into the stator piece 13 or vice versa.

In such a transformer, at least one rotor piece groove per one head is required, which, in turn, sets a limit on the degree of transformer miniaturization.

SUMMARY OF THE INVENTION

It is, therefore, a primary object of the present invention to provide a miniature transformer for use in a digital video cassette recorder.

It is another object of the present invention to provide a transformer having a groove which can be commonly used for a pair of heads.

In accordance with one aspect of the present invention, there is provided a head drum assembly for use in a digital video cassette recorder incorporating therein a shaft, a flange rotatably fitted around the shaft, a rotary drum fixed pressed on the flange, and a stationary drum fitted the shaft, the head drum assembly further comprising; a transformer including a rotor piece which is mounted on the flange and has a groove, and a stator piece which is mounted on the stationary drum so as to be aligned but separated from the rotor piece by a predetermined gap therebetween and has an identical groove as that of the rotor piece groove and into which a winding is inserted; and a first and a second heads each of which is attached on the rotary drum, wherein said heads are electrically connected to each other by a first and a second wires, one end of the first wire wound around the rotor piece groove being connected to the first head and the other end thereof being connected to the second head so as to transmit signals from the heads into the stator pieces or vice versa.

BRIEF DESCRIPTION OF THE DRAWINGS

The above and other objects and features of the present invention will become apparent from the following description of preferred embodiments, when taken in conjunction with the accompanying drawings, in which.

DETAILED DESCRIPTION OF THE PREFERRED EMBODIMENTS

Figure 1:
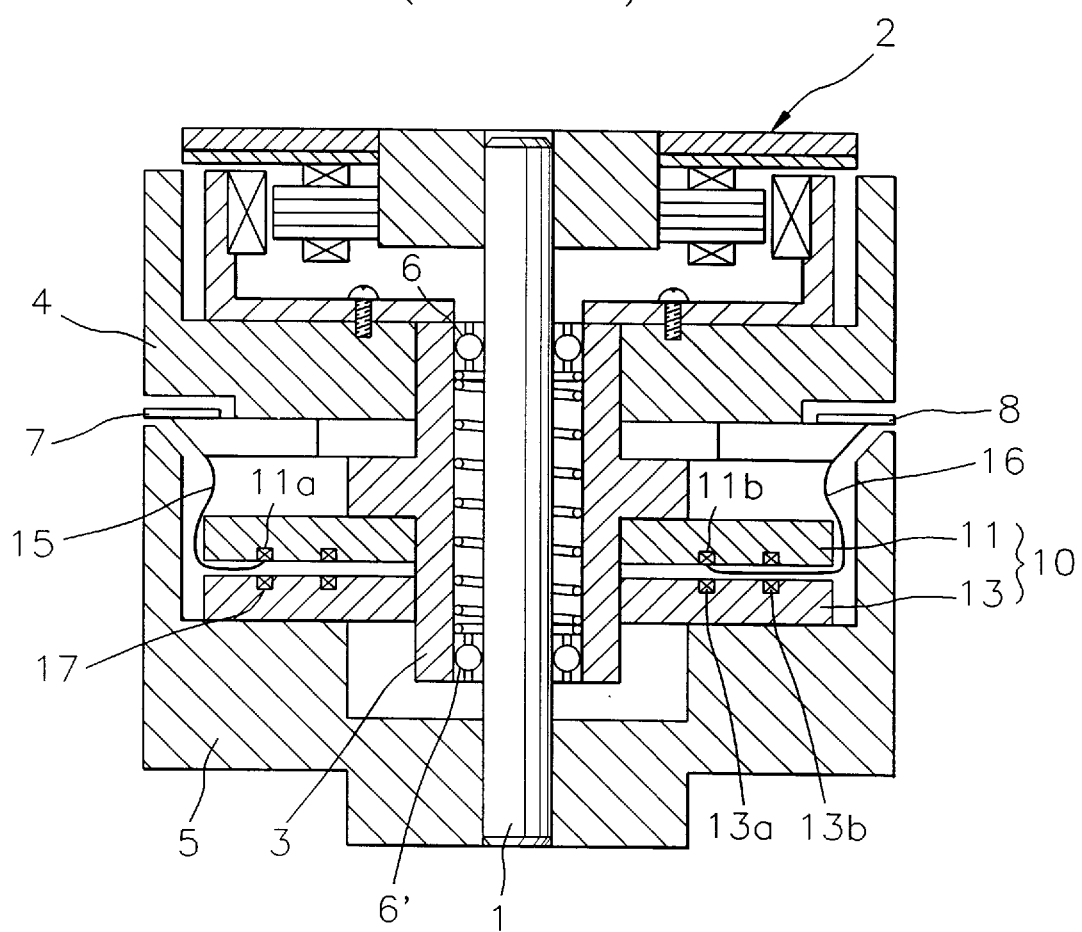
FIG. 1 shows a cross sectional view of the conventional head drum assembly for use in a digital video cassette recorder.
Figure 2:
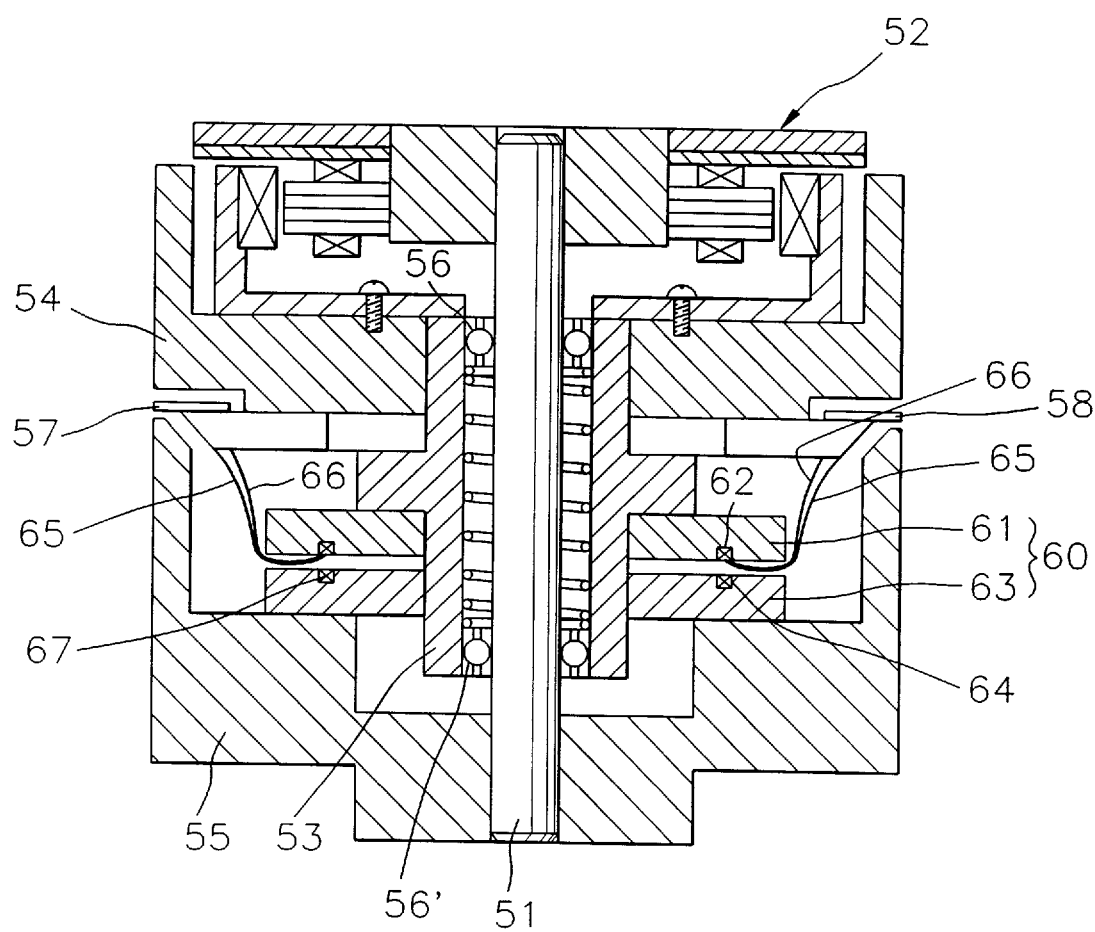
FIG. 2 illustrates a cross sectional view of the inventive head drum assembly for use in a digital video cassette recorder.

Referring to FIG. 2, there is shown a cross sectional view of a head drum assembly for use in a digital video cassette recorder.

The inventive head drum assembly includes a fixed shaft 51, a drum motor 52, a flange 53, a rotary drum 54, a stationary drum 55, an upper and a lower bearings 56, 56', a first and a second heads 57, 58, a transformer 60 having a rotor and a stator pieces 61, 63.

As shown, the drum motor 52 is adjoined to an upper portion of the fixed shaft 51. The flange 53 on which the rotary drum 54 is fixedly pressed is joined with a middle portion of the fixed shaft 51 via the bearings 56, 56' in such a way that the flange 53 rotates by a driving force of the drum motor 52. The pair of heads 57, 58 are attached on a lower surface of the rotary drum 54. The stationary drum 55 is tightly pressed onto a lower portion of the fixed shaft 51.

Figure 3A:
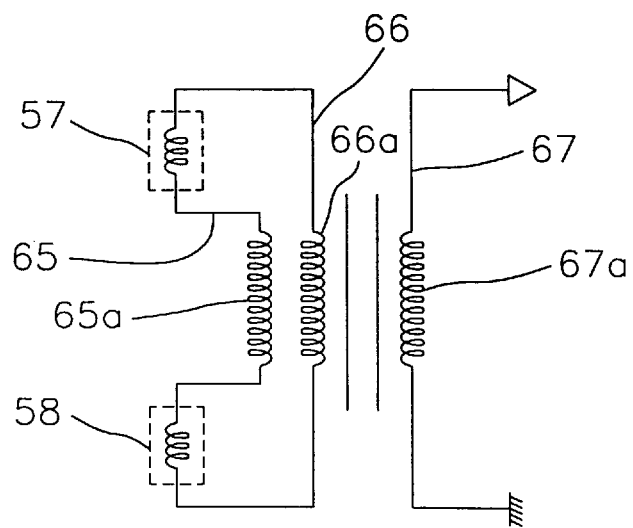
FIGS. 3A and 3B depict circuit diagrams of a transformer incorporated the head drum assembly in accordance with the present invention.
Figure 3B:
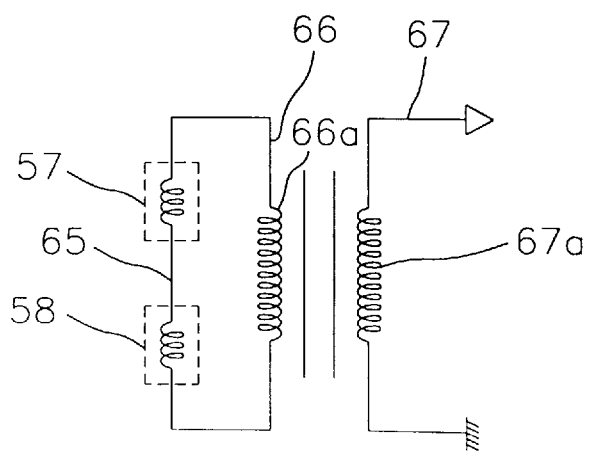

The rotor piece 61 of the transformer 60 is attached on the flange 53 and the stator piece 63 is attached on a top surface of the stationary drum 55 in such a way that the rotor and the stator piece 61, 63 are aligned but separated from each other by a predetermined gap therebetween. The rotor piece 61 has a circular groove 62 which is commonly used for the pair of the heads 57, 58, as will be described in later; the first and the second heads 57, 58 are electrically connected to each other by a first and a second lead wires 65, 66. As shown in FIGS. 2 and 3A, both the first lead wire 65 and the second lead wire 66 extend from the first head 57 into the second head 58 via the rotor piece groove 62. To be more specific, both the first lead wire 65 and the second lead wire 66 are wound around the rotor piece groove 62 together to form coil 65a and coil 66a, respectively. As shown in FIG. 3B, the first lead wire 65 may extend from the first head 57 into the second head 58 directly and the second lead wire 66 may extend from the first head 57 into the second head 58 indirectly, in other words, via the rotor piece groove 62 (see FIG. 2) so as to form a coil 66a. The stator piece 63 has an identical groove 64 as that of the rotor piece 61. The stator piece groove 64 accommodates a third lead wire 67 connected to a signal process system. The third lead wire 67 is wound around the stator piece groove 64 so as to form a third coil 67a, thereby transmitting signals from the heads 57, 58.

In such a transformer, since the rotor piece groove is commonly used for the pair of heads, it is possible to miniaturize the transformer.

Although the invention has been shown and described with respect to the preferred embodiment, it will be understood by those skilled in the art that various changes and modifications may be made without departing from the scope of the invention as defined in the following claims.

What is claimed is:

1. A head drum assembly for use in a digital video cassette recorder incorporating therein a shaft, a flange rotatably fitted around the shaft, a rotary drum fixedly pressed on the flange, a stationary drum fitted around the shaft, a first head and a second head, the head drum assembly comprising:

a transformer including a rotor piece which is mounted on the flange and which has a groove around which a first lead wire is wound, and a stator piece which is mounted on the stationary drum so as to be aligned but separated from the rotor piece by a predetermined gap therebetween and the stator piece having an identical groove as that of the rotor piece, wherein the first head and the second head are electrically connected to each other by the first lead wire extending from the first head into the second head via the rotor piece groove and a second lead wire directly extending from the first head into the second head, and the stator piece groove accommodates a third lead wire for transmitting transmit signals from the heads.

2. A head drum assembly for use in a digital video cassette recorder incorporating therein a shaft, a flange rotatably fitted around the shaft, a rotary drum fixedly pressed on the flange, a stationary drum fitted around the shaft, a first head and a second head, the head drum assembly comprising:

a transformer including a rotor piece which is mounted on the flange and which has a groove around which a first lead wire and a second lead wire are wound, and a stator piece which is mounted on the stationary drum so as to be aligned but separated from the rotor piece by a predetermined gap therebetween and the stator piece having an identical groove as that of the rotor piece, wherein the first head and the second head are electrically connected to each other by the first lead wire and the second lead wire, each lead wire extending from the first head into the second head via the rotor piece groove, and the stator piece groove accommodates a third lead wire for transmitting signals from the heads.

* * * * *

UNITED STATES PATENT AND TRADEMARK OFFICE
CERTIFICATE OF CORRECTION

PATENT NO. : 5,870,257
DATED : February 9, 1999
INVENTOR(S) : Yeo-Uk Joe

It is certified that error appears in the above-identified patent and that said Letters Patent is hereby corrected as shown below:

On the title page, item [30]:

Foreign Application Priority Data

May 21, 1996   [KR]   Rep. of Korea     96-12715

Signed and Sealed this

Eighth Day of June, 1999

Attest:

Q. TODD DICKINSON

*Attesting Officer*        Acting Commissioner of Patents and Trademarks